A. SCHWARZ.
SYSTEM OF SUPPLYING AN EXPLOSIVE MIXTURE TO ENGINES AND TURBINES.
APPLICATION FILED JULY 10, 1918.

1,384,570.

Patented July 12, 1921.
2 SHEETS—SHEET 1.

Alfred Schwarz, Inventor.
By his Attorneys,
Kerr Page Cooper & Hayward.

A. SCHWARZ.
SYSTEM OF SUPPLYING AN EXPLOSIVE MIXTURE TO ENGINES AND TURBINES.
APPLICATION FILED JULY 10, 1918.
1,384,570.
Patented July 12, 1921.
2 SHEETS—SHEET 2.
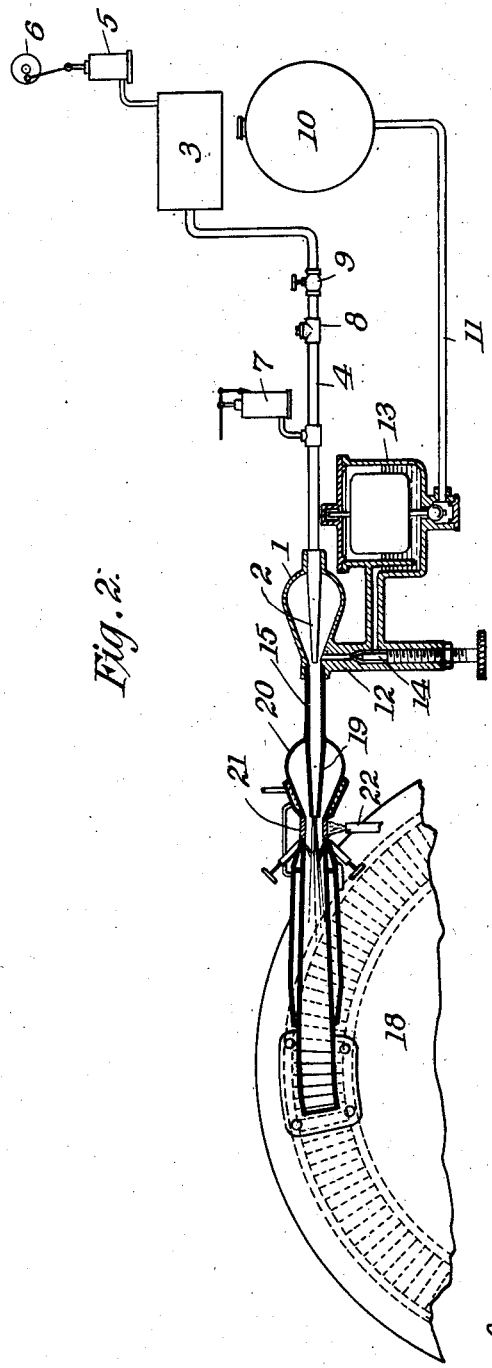
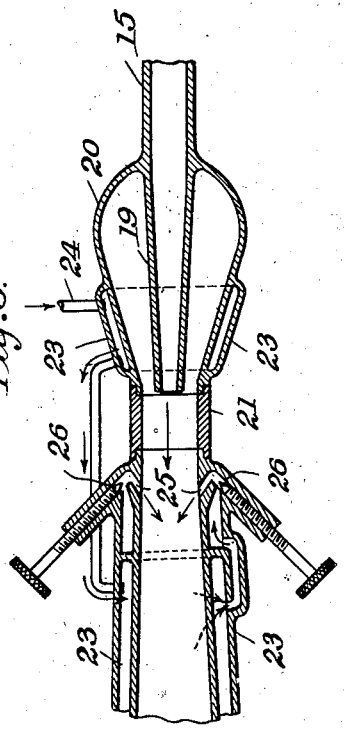
Alfred Schwarz, Inventor
By his Attorneys,

UNITED STATES PATENT OFFICE.

ALFRED SCHWARZ, OF JOPLIN, MISSOURI, ASSIGNOR TO WILLIAM SCULLY, TRUSTEE, OF BROOKLYN, NEW YORK.

SYSTEM OF SUPPLYING AN EXPLOSIVE MIXTURE TO ENGINES AND TURBINES.

1,384,570.   Specification of Letters Patent.   Patented July 12, 1921.

Application filed July 10, 1918. Serial No. 244,183.

*To all whom it may concern:*

Be it known that I, ALFRED SCHWARZ, a citizen of the United States, residing at Joplin, in the county of Jasper and State of Missouri, have invented certain new and useful Improvements in Systems of Supplying an Explosive Mixture to Engines and Turbines, of which the following is a full, clear, and exact description.

This invention relates to a system for supplying motive fluid to a heat engine independently of the suction of such engine and preferably under pressure.

In my prior application, Ser. No. 26,685, filed May 8th, 1915, I disclosed a system in which a hydro-carbon vapor under pressure was supplied to a Venturi tube to create a suction or negative head thereby to draw air into the stream of vapor to form a combustible mixture. This mixture was then supplied to an internal combustion engine or to a combustion chamber and thence to a turbine or similar engine.

The present invention relates to substantially the same general type of system and has for one of its principal objects to provide a system in which air under pressure is supplied to a Venturi tube to which a supply of liquid or other fuel is connected adjacent the contracted section and which tube then discharges its mixture or motive fluid directly or through instrumentalities hereinafter described to a heat engine. In employing the expression heat engine I intend to include internal combustion engines, turbines, steam engines and the like.

Another object is to provide a system in which a combustible mixture is formed by means including a Venturi tube and which mixture is then ignited in a combustion chamber, preferably in the form of a Venturi tube, then reduced in temperature and supplied to a turbine or other pressure or velocity actuated heat engine. Further objects and advantages will appear as the invention is hereinafter developed.

Referring to the drawings which illustrate, somewhat diagrammatically, what I now consider the preferred forms of my invention:

Fig. 2 is a similar view illustrating my system in which the combustible or motive fluid is supplied to a combustion chamber and thence to a turbine.

Fig. 3 is an enlarged fragmentary sectional detail view of the combustion chamber forming a part of the system illustrated in Fig. 2.

Figure 1:
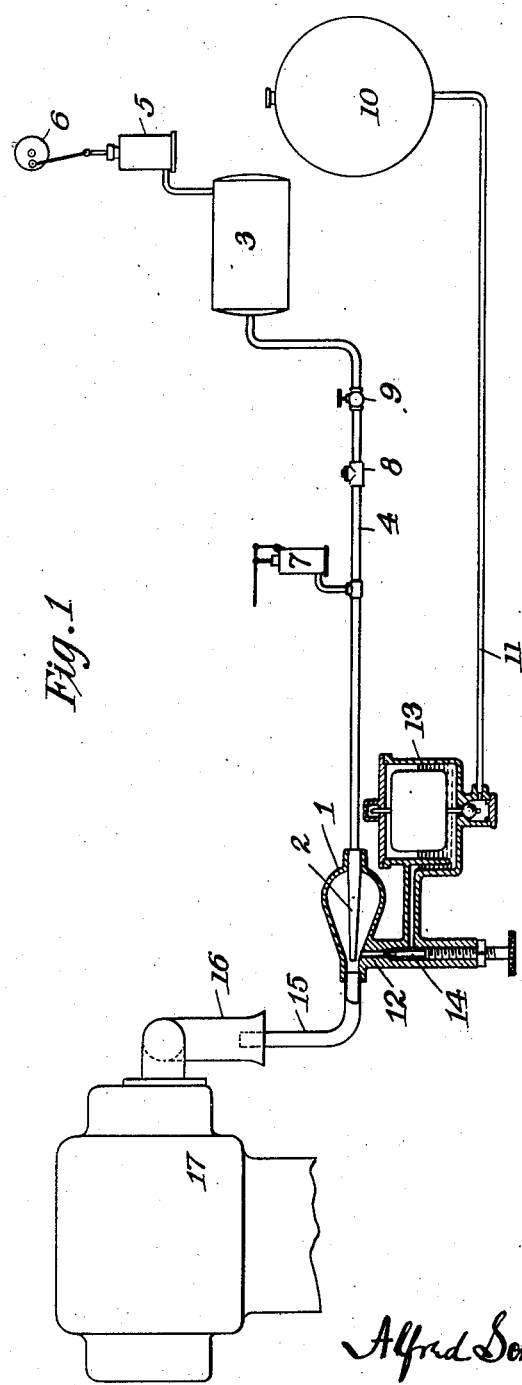
Figure 1 is an elevation, partly in section, of my system for supplying combustible fluid to an internal combustion engine.

It will be seen that I have shown a Venturi tube 1, in Fig. 1, into which air under pressure is injected through a nozzle 2. While the rear of the tube 1 may be left open I prefer to close it to exclude foreign matter from the mixture. The air under pressure may be supplied through a pipe or conduit 4 from a tank or reservoir 3 in which the pressure is maintained by a pump or other compressor 5 driven by the engine as indicated diagrammatically at 6. The flow of air through the nozzle 2 may be controlled by means of a valve 9 in the pipe line 4. A hand pump 7 connected to said pipe 4 may be utilized to supply the air under pressure when the engine is being started and in case of breakdown of pump 4. A check valve 8 inserted in the line 4 between the pump 7 and tank 3 prevents flow of air from the former to the latter, thereby avoiding the necessity of compressing the large volume of air in the tank when the hand pump is employed.

Suitable fuel, such as gasolene, petroleum or the like is supplied adjacent the contracted section, or vacuum portion, of the Venturi tube 1. This fuel may be supplied from a tank 10 through a pipe line 11, 12 in which are included a float valve 13 and a needle or other regulating valve 14. The float valve 13 serves to maintain a substantially constant level of liquid in the pipe 12 while the valve 14 may be employed to regulate the ratio of fuel volume to air volume.

While the discharge pipe 15 of the tube 1 may be directly connected to an internal combustion motor or combustion chamber as disclosed in my prior application, *supra*, I have shown it, in Fig. 1, discharging into a second Venturi tube 16 which in turn discharges into the internal combustion engine 17. The rear end of the tube 16 is left open so that additional air will be drawn in and combined with the mixture at this point.

The operation of the system thus far disclosed may be briefly explained as follows. The air pump 7, when operated causes a flow of air through the Venturi tube 1 thus creating a vacuum, or negative head, adjacent the outlet of fuel pipe 12. This causes the fuel to become atomized and completely mixed with the stream of air thus forming a combustible mixture. Air in the proper proportion will be drawn in and added to the mixture discharged from the pipe 15. The motive fluid, in the form of a combustible mixture of the desired composition is then discharged under pressure from the tube 16 into the engine 17 when it is ignited to drive said engine. By adjusting the valves 9 and 14 the volume and composition of the motive fluid supplied to the engine may be regulated at will.

It should be noted that the above described system, while possessing advantages pointed out in connection with the system disclosed in my prior application, is simpler in that no means for preheating the fuel is employed. Furthermore I wish to point out that, among other uses, my system is particularly adapted to replace or supplement the present systems employed on air craft. When the latter rise to comparatively high altitudes the air becomes rarefied and it is greatly desirable to provide a pressure, at the engine manifold, above that of the atmosphere. As my system supplies the fuel mixture or motive fluid under pressure its adaptability for the last mentioned use is obvious.

In Figs. 2 and 3 I have illustrated a preferred form of combustion chamber adapted to be employed in connection with a turbine or similar heat engine 18. A combustible mixture under pressure is supplied through the nozzle 19 to the combustion chamber 20 which is preferably in the form of a Venturi tube. Ignition means is provided a slight distance ahead of the smallest section of said Venturi tube. Of the various forms of ignition means such as spark plugs, hot filaments, finely divided or sponge platinum, hot bulbs, hot rings or equivalent means, I have selected the hot ring type for the purpose of illustration. The ring 21 is shown heated by a pilot flame 22. I also provide means to reduce the temperature of the hot motive fluid before it enters the turbine so that injury to the latter is prevented. The means illustrated comprises a jacket or jackets 23 provided on the tube 20 through which jackets water, or other cooling fluid, is adapted to be circulated. The water may be introduced at 24, flow through the jacket 23, as indicated by the arrows, and enter the tube 20 through openings 25.

By virtue of the above described water jacket 23 the hot gases formed by the burning of the mixture supplied through the nozzle 19 will be reduced in temperature. It will also be noted that the water will be atomized at 25, by the aspirator action of the stream of hot gas, and flashing into steam will not only further reduce the temperature but will also increase both the volume and velocity of the gas discharged by the tube into the turbine, to an amount greater than that which would result from using the water jacket above and dispensing with the ports 25. Thus practically no energy is lost in reducing the temperature of the hot gas the desired amount. Needle valves 26 are preferably provided to control the flow of water and the amount of steam added to the gas stream.

While the nozzle 19 may be supplied with combustible mixture by the system disclosed in my prior application, I have shown the same type of system illustrated in Fig. 1 of the present application, similar parts being designated by the same reference characters.

The operation of the form of invention illustrated in Figs. 2 and 3 will be understood by those skilled in the art, especially in view of the above description so that no further explanation is necessary.

It is to be understood that I do not confine myself to the exact mechanism illustrated and described, as the devices illustrated are largely diagrammatic, and the proportions of the various parts are omitted to avoid prolixity of description. It is therefore obvious that many changes may be made in points of detail and other embodiments resorted to without deviating from the true spirit and scope of my invention.

I claim:—

1. In combination, a heat engine, a Venturi tube, means for supplying air under pressure to said tube, means for supplying fuel to the vacuum portion of said tube, said fuel being drawn into the tube solely by the vacuum induced at the throat by the flow of air therethrough, a second Venturi tube into which said first tube discharges and which discharges into said engine and means for igniting the mixture in said second tube adjacent the throat portion thereof.

2. In combination, a heat engine, a Venturi tube, means for supplying air under pressure to said tube, means for supplying fuel to the vacuum portion of said tube, said fuel being drawn into the tube solely by the vacuum induced at the throat by the flow of air therethrough, a second Venturi tube into which said first tube discharges and which discharges into said engine, means for igniting the mixture in said second tube adjacent the throat portion thereof and means for reducing the temperature of the ignited mixture prior to its discharge into said engine.

3. In combination, a heat engine, a Venturi tube connected to said engine to discharge into the same, means comprising a Venturi tube for supplying a combustible mixture to said first mentioned tube and means for igniting said mixture at a point adjacent the contraction of said first tube.

4. In combination, a heat engine, a Venturi tube connected to said engine, to discharge into the same, and water-jacketed at its discharge end, means comprising a Venturi tube for supplying a combustible mixture to said first mentioned tube, means for causing combustion of said mixture adjacent the contraction of said first tube and means for injecting a cooling fluid into the burned mixture to reduce the temperature thereof before introduction thereof into said engine.

5. In combination, a heat engine, a Venturi tube connected to said engine to discharge into the same, said tube being provided with a water-jacket between its contracted section and the discharge end, means comprising a Venturi tube for supplying a combustible mixture to said first tube, means for igniting said mixture adjacent the contracted section of the first tube and a passage connecting the interior of the first tube and its jacket at, at least, one point between the place of ignition and the discharge end of said last mentioned tube.

6. In combination a heat engine, a Venturi tube connected to said engine to discharge into the same, means for supplying combustible mixture to said Venturi tube, said means comprising a Venturi tube, means for supplying air under pressure to said tube, means for supplying fuel to the throat portion of said tube, said fuel being drawn into the tube by the vacuum induced by the flow of air past the throat of the tube, and means for igniting the mixture adjacent the throat of the first mentioned Venturi tube.

7. In combination a heat engine, a Venturi tube, means for supplying air under pressure to said tube, means for supplying fuel to the throat of the tube, said fuel being drawn into the tube by the vacuum induced at the throat of the tube by the flow of air supplied by the aforesaid means, a second Venturi tube intermediate the first venturi and the heat engine, through which the mixture passes as it flows to the engine, means for igniting the mixture adjacent the throat of the venturi, water jackets for cooling the mixture, and means to admit and control the quantity of water admitted to said mixture to cool the burning gases.

8. The invention set forth in claim 7 in which the first mentioned venturi is provided with cooling jackets having means to admit cooling fluid therefrom to said mixture to cool the same, said means including needle valves to control the quantity of cooling fluid admitted from the jackets to the mixture.

In testimony whereof I hereunto affix my signature.

ALFRED SCHWARZ.